United States Patent [19]

Leaphart

[11] Patent Number: 5,665,171
[45] Date of Patent: Sep. 9, 1997

[54] METHOD FOR CLEANING AN OIL STRAINER AND PAN

[76] Inventor: Dwight Leaphart, 112 Cornish Way, Lexington, S.C. 29073

[21] Appl. No.: 570,545

[22] Filed: Dec. 11, 1995

[51] Int. Cl.⁶ .................. B08B 9/08; B08B 3/08; B08B 3/10
[52] U.S. Cl. .................. 134/22.18; 134/22.19; 134/34
[58] Field of Search .................. 134/22.1, 22.18, 134/22.19, 24, 34, 40, 169 A; 184/1.5

[56] References Cited

U.S. PATENT DOCUMENTS

| | | |
|---|---|---|
| 2,320,048 | 5/1943 | Parson .................. 184/1.5 |
| 2,554,389 | 5/1951 | Stevens .................. 134/167 |
| 3,489,245 | 1/1970 | Broadwell .................. 184/1.5 |
| 4,884,660 | 12/1989 | Bedi .................. 184/1.5 |
| 4,951,784 | 8/1990 | Bedi .................. 184/1.5 |
| 5,044,334 | 9/1991 | Bedi .................. 123/196 |
| 5,062,398 | 11/1991 | Bedi et al. .................. 123/196 R |
| 5,154,775 | 10/1992 | Bedi .................. 134/22.1 |
| 5,190,120 | 3/1993 | Watts .................. 184/1.5 |
| 5,209,198 | 5/1993 | Bedi .................. 123/196 |
| 5,232,513 | 8/1993 | Suratt et al. .................. 134/21 |
| 5,383,481 | 1/1995 | Wailput .................. 134/56 R |
| 5,474,098 | 12/1995 | Grigorian et al. .................. 134/169 A |
| 5,566,781 | 10/1996 | Robert et al. .................. 184/1.5 |

*Primary Examiner*—Jeffrey Snay
*Attorney, Agent, or Firm*—Foley & Lardner

[57] ABSTRACT

An apparatus and method for cleaning an oil strainer and pan in an internal combustion engine from which essentially all lubricant has been drained. A solvent is pumped into the oil pan. The solvent is agitated and cooled. The solvent is then drained.

17 Claims, 3 Drawing Sheets

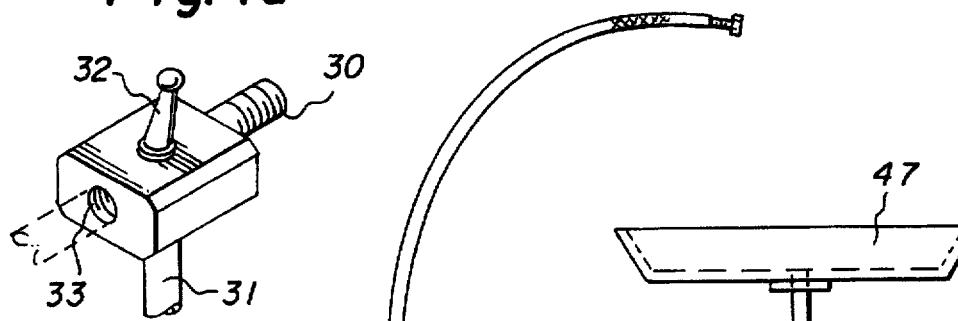
Fig. 1a
Fig. 1
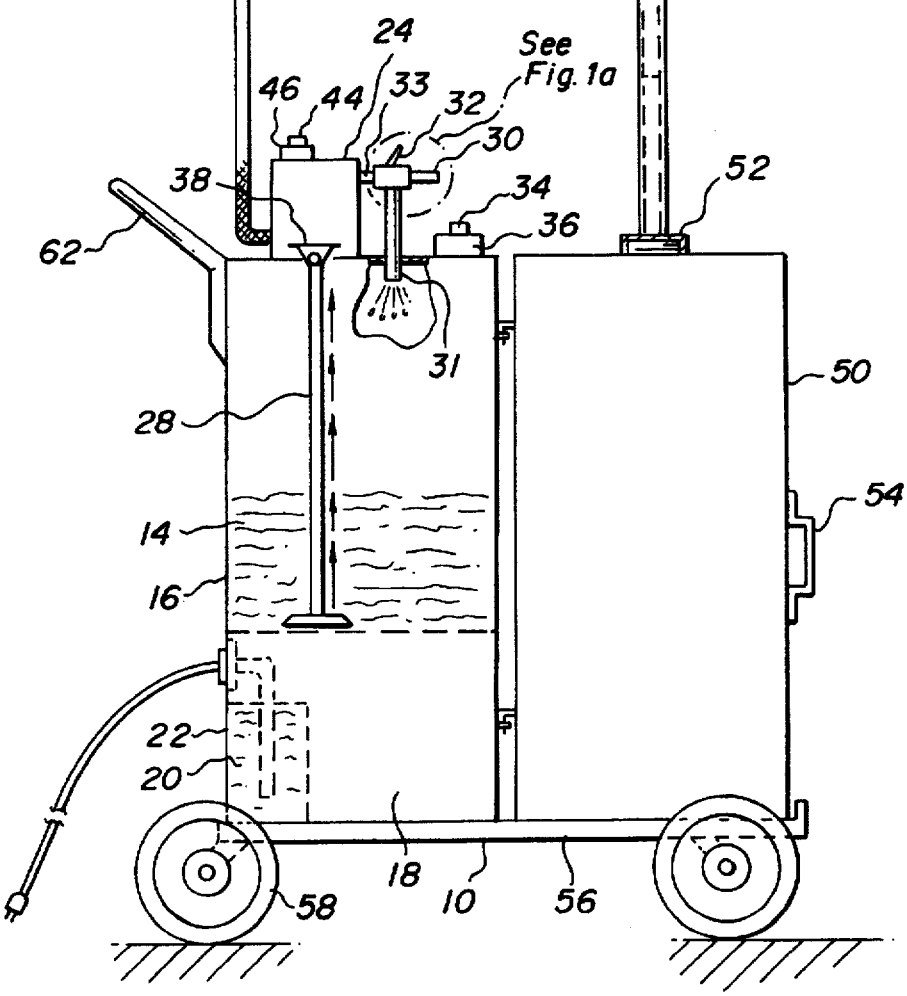

METHOD FOR CLEANING AN OIL STRAINER AND PAN

FIELD OF THE INVENTION

The invention is directed to an apparatus and method for cleaning an oil strainer and pan. In particular, the invention is specifically adapted to work with an automobile's existing equipment and not clean the entire engine block.

BACKGROUND OF THE INVENTION

Automobiles and their engines have become progressively smaller. Due to this reduced size, the oil strainer is often located in close proximity to the bottom of the oil pan. This causes contaminants in the oil to flow towards the strainer and restrict or cut off entirely the flow of oil to the engine. The lack of adequate lubrication causes expensive engine repair.

Thus, it is desirable to provide an apparatus and method for cleaning just the oil strainer. It is also desirable to use an apparatus to insert the solvent which sealingly fits with the oil pan drain without altering the existing oil pan. It is also desirable to use a precise amount of solvent which will only rise to the level of the top of the oil strainer to prevent other residue from draining and further clogging the oil strainer. Finally it is desirable to agitate the solvents in order to encourage loosening of debris on the oil strainer.

SUMMARY OF THE INVENTION

The present invention is directed to an apparatus and method for cleaning an oil strainer and pan. Generally, the process involved is one in which a measured amount of a solvent gradually fills an oil pan to a level sufficient to cover the oil strainer. The solvent is then agitated slightly and cooled. The used solvent is then drained.

In the preferred embodiment of the invention, air pressure is used to transfer solvent from a first tank to a second tank. Air pressure is then used to transfer the solvent from the second tank to the oil pan. The amount of solvent transferred from the first to the second tank and then to the oil pan should be sufficient to cover the oil strainer. The solvent is then agitated by air in the oil pan, which aids in loosening debris from the oil strainer and pan and cooling the solvent. The used solvent is then drained. In this embodiment, solvent may be heated or unheated.

In another embodiment of the invention, the solvent is placed directly into the second tank, rather than being transferred from the first tank. In this embodiment, a stronger solvent may be used an is unheated. The second tank may be detachable from the first tank.

In another embodiment of the invention, other types of fluid transfer systems are utilized instead to transfer solvent from the first to the second tank, such as suction, a hydraulic bottom to the first tank, individual pressurizing pumps or the like.

BRIEF DESCRIPTION OF THE DRAWINGS

FIG. 1 is a cross-sectional view of the apparatus according to the invention;

FIG. 1a is a perspective view of a spool valve;

DESCRIPTION OF THE PREFERRED EMBODIMENT

Figure 3:
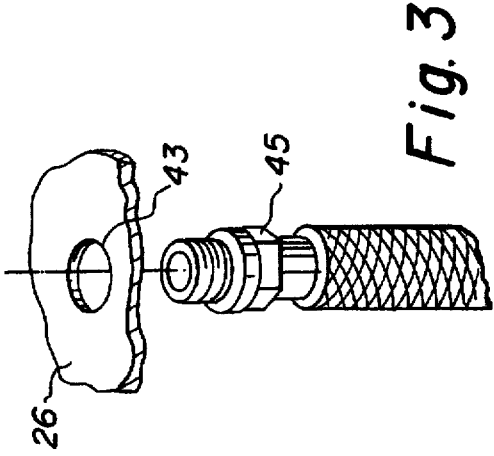
FIG. 3 is a fragmentary view of a connector and the oil pan drain plug area.

Referring to the Figures, there is illustrated the apparatus 10 for cleaning an oil strainer 12. The apparatus deals primarily with the distribution of a solvent 14.

The solvent 14 begins in a first tank 16. As illustrated, the solvent 14 is heated via an electric heating element 18 and water 20. Appropriate solvents are products sold commercially such as GUNK carburetor cleaner, Safe Clean, or Orange. The water 20 is contained in a water tank 22 which should hold about three gallons of water 20. It will be clear to one of ordinary skill in the art that alternative means of heating solvent 14 may be employed. For example, a heating blanket may be used to heat solvent 14.

Once the solvent 14 has been heated, it may then be pumped from the first tank 16 to a second tank 24. The amount of solvent needed to fill an oil pan 26 to the level of the top of the oil strainer 12 will be pumped from the first tank 16 to the second tank 24. As defined herein, "pump" may be any of various devices for transferring fluid, e.g. an air compressor used in auto service stations connected through valves to the apparatus described.

Air pressure is used to pump the solvent 14 from the first tank 16 to the second tank 24 by forcing the solvent 14 up through a conduit 28 to the second tank 24. The air pressure may come from any pressured air source, but in the context of the typical garage, it will ideally come from the garage's main air pump (not shown). The air pump would be attached to inlet 30 and air would be directed by spool valve 32 to the first tank 16. The air pressure applied to the solvent 14 is between about 12 and about 15 p.s.i. A pressure relief valve 34 may be added to prevent the air pressure from exceeding a designated level. The pressure relief valve 34 should be set to a value of about 20 p.s.i. However, it will be obvious to one of ordinary skill in the art that the pressure settings are determined by the temperature and the solvent used. The pressure relief valve 34 is a safety feature to prevent the tank 16 from being over-pressurized during use. The pressure relief valve 34 may be disposed on a removable cap 36, through which additional solvent may be added. Once a sufficient amount of solvent 14 has been pumped from the first tank 16, to the second tank 24, the air pressure to the first tank 16 is redirected to second tank 24 by valve 32, as described below. The first tank 16 and second tank 24 are connected by a one way check valve 38 to prevent solvent 14 from flowing back from the second tank 24 to the first tank 16.

Other embodiments may be envisioned. For example, the air pressure source may be attached by inlet 31 directly to the first tank 16. In addition, other pumps operating, for example, by suction may be used to draw solvent 14 from first tank 16 to second tank 24. Alternatively, a pump may operate by a hydraulic or other type of bottom (not shown) to first tank 16 being used to create pressure to force solvent 14 from first tank 16 to second tank 24. Any number of pumps for transferring solvent 14 from first tank 16 to second tank 24 will be obvious to one of ordinary skill in the art and are intended to be incorporated in the present disclosure.

Another embodiment which may be envisioned is one in which solvent 14 is heated prior to being inserted into first tank 16. In such an embodiment, first tank 16 will require insulation (not shown). First tank 16 may be insulated in any embodiment in order to reduce energy consumption and to reduce the outside temperature of the tank for safety purposes.

It will also be obvious to one of ordinary skill in the art that depending on the nature of the solvent used, it may not need to be heated to come within the scope of the invention. An unheated solvent may be similarly used to obtain a similar result.

Once the solvent 14 has been pumped from first tank 16 to second tank 24, solvent 14 is further pumped from second tank 24 with air pressure to oil pan 26 through conduit 40. Solvent 14 should be pumped from second tank 24 to oil pan 26 at a relatively low pressure, so as to avoid the solvent contacting the area of the engine 42 above the oil pan 26. The air pressure may come from any pressurized air source, but in the context of the typical garage, it will ideally come from the garage's main air pump. The air pump would be attached to inlet 30 and air would be directed by spool valve 32 to second tank 24. Ideally, the air pressure applied to solvent 14 should be between about 4 and about 7 p.s.i. A pressure relief valve 44 may be added to prevent the air pressure from exceeding a designated level. Ideally, the pressure relief valve 44 should be set to a value of about 8 p.s.i. The pressure relief valve may be disposed on a removable cap 46 through which additional solvent may be added. Conduit 40 should be sealingly attached to the oil pan 26 through the drain plug opening 43 as shown in FIG. 3. Conduit 40 may be attached to oil pan 26 by a hydraulic quick-connector 45. It will be obvious to one of ordinary skill in the art that other types of connectors may be used to connect conduit 40 to oil pan 26 without departing from the scope of the invention.

In another embodiment, the step of pumping solvent 14 from the first tank 16 to the second tank 24 may be omitted. In such an embodiment, second tank 24 may be detachable from first tank 16. Solvent, whether heated or not, may be added through removable cap 46. Such an option may be used when only a more confined space is available, the service is to be performed at a remote site or if a stronger solvent is required. It will be obvious to one of ordinary skill in the art that tank 24 may be used separately with conduit 44 and a pump to perform the function.

In another embodiment, air pressure may be directly applied through inlet 33 rather than via inlet 30 and spool valve 32.

Figure 5:
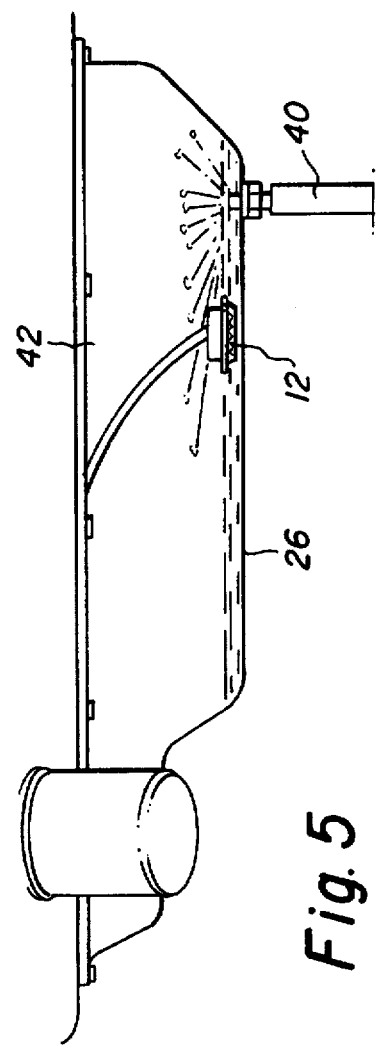
FIG. 5 is a cross-sectional view of an oil pan and oil strainer with the air supply connected to the oil pan, the air agitating the solvent.

Once the solvent 14 has been pumped into oil pan 26, solvent 14 is gently agitated and cooled by air, as illustrated in FIG. 5. The air enters through conduit 40 at a low pressure, so that solvent 14 does not contact the area of the engine 42 above oil pan 26. The air pressure serves to agitate solvent 14 to dislodge debris from oil strainer 12. The air pressure also cools solvent 14 when solvent 14 is heated to allow safer handling and disposal of the used solvent.

Figure 4:
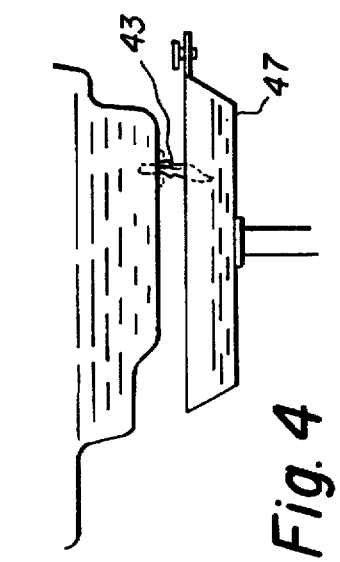
FIG. 4 is a cross-sectional view of the oil pan and collector showing the draining procedure.
Figure 6:
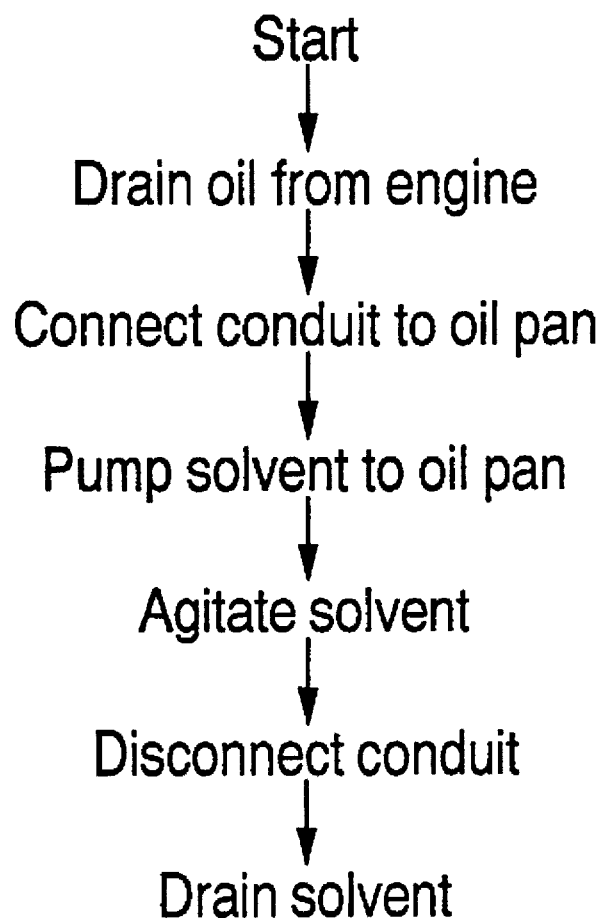
FIG. 6 is a flow chart showing the process of cleaning an oil strainer and pan according to the invention.

The cooled solvent 14 is then drained from the oil pan 26, as shown in FIG. 4. Connector 45 is detached from the oil pan 26 and the cooled solvent is drained into a collector 46. Collector 46 has a large diameter to prevent cooled solvent 14 from splashing on personnel or surfaces. Collector 47 is placed near the drain plug opening 43 for the same reason. Cooled solvent 14 drains from collector 47 through conduit 48 to third tank 50.

Figure 2:
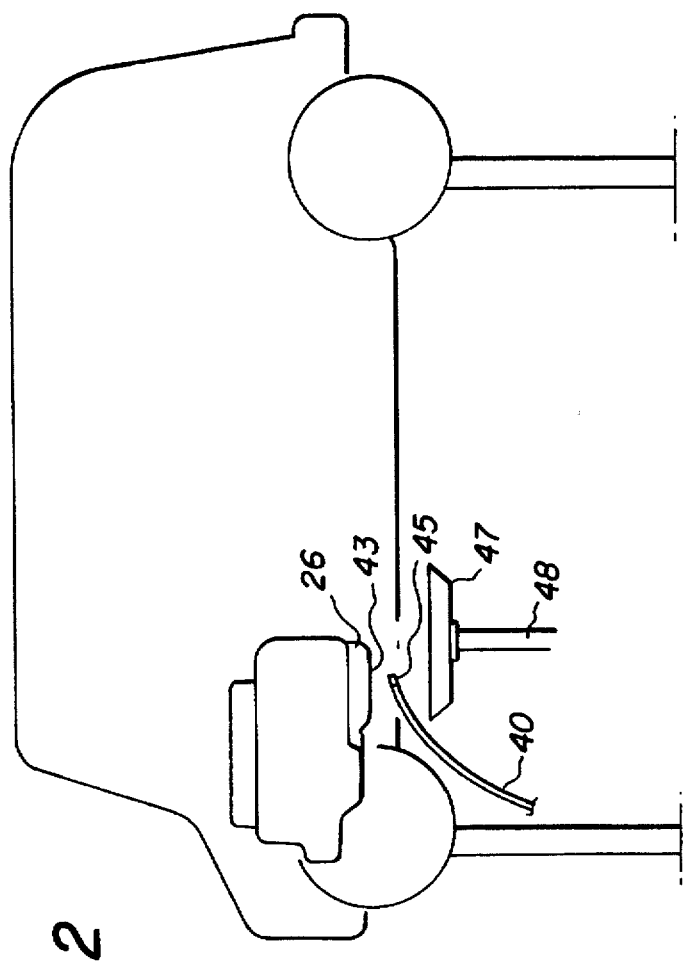
FIG. 2 is a cross-sectional view of a vehicle on a garage lift, illustrating the oil pan location and the hose and collector.

Conduit 48 is adjustable in length to accommodate various cars and various lift heights as shown in FIG. 2. In addition, conduit 48 may be removable from tank 50 to allow easy disposal of cooled solvent 14. One or more handles 54 are disposed on third tank 50 to allow tank 50 to be moved to dispose of cooled solvent 14. Tank 50 should not be permanently affixed to any of the other portions of the apparatus 10.

In order to maximize the use of the solvent it can be filtered by a conventional paper or cloth filter (not shown) and reused. The filter may be added for ease at the inlet 52 to tank 50.

Apparatus 10 is disposed on cart 56. Cart 56 may have at least 2 wheels 58 to allow apparatus 10 ease of mobility. Cart 56 may have 4 wheels, two of which steer or 2 wheels and a stand 60. Cart 56 may also have a handle 62 for ease of pushing and steering.

It will be obvious to one of ordinary skill in the art that various modifications and variations can be made without departing from the scope of the invention as defined in the following claims.

What is claimed is:

1. A method for cleaning an oil strainer and pan in an internal combustion engine from which substantially all the lubricant has been drained, comprising:

pumping a sufficient amount of solvent into said oil pan so as to fill said oil pan to the level of said strainer only;

agitating said solvent in said pan; and draining said solvent.

2. The method for cleaning an oil strainer and pan in an internal combustion engine from which substantially all the lubricant has been drained according to claim 1, and further comprising:

heating said solvent prior to pumping said solvent into said oil pan.

3. The method for cleaning an oil strainer and pan in an internal combustion engine from which substantially all the lubricant has been drained according to claim 1, and further comprising:

cooling said solvent prior to draining said solvent.

4. A method for cleaning an oil strainer and an oil pan in an internal combustion engine from which substantially all the lubricant has been drained comprising:

pumping a sufficient amount of solvent via means for pumping said solvent from a tank for holding said solvent through a conduit extending between said tank and said oil pan so as to fill said oil pan to the level of said strainer only;

agitating said solvent in said oil pan via means for agitating said solvent; and draining said solvent from said oil pan to a means for collecting said solvent.

5. A method for cleaning an oil strainer and an oil pan in an internal combustion engine from which substantially all the lubricant has been drained comprising:

holding a solvent in a tank;

extending a conduit between said tank and said oil pan;

pumping a sufficient amount of said solvent from said tank through said conduit to said oil pan so as to fill said oil pan to the level of said strainer only;

agitating said solvent in said oil pan; and collecting said solvent from said oil pan.

6. A method for cleaning an oil strainer and pan in an internal combustion engine from which substantially all the lubricant has been drained according to claim 5, further comprising agitating said solvent in said oil pan with an air pump.

7. A method for cleaning an oil strainer and pan in an internal combustion engine from which substantially all the lubricant has been drained according to claim 5, further comprising heating said solvent.

8. A method for cleaning an oil strainer and pan in an internal combustion engine from which substantially all the lubricant has been drained according to claim 5, further comprising pumping and agitating said solvent with a single air pump.

9. A method for cleaning an oil strainer and pan in an internal combustion engine from which substantially all the lubricant has been drained according to claim 5, wherein pumping solvent into said oil pan further comprises pumping said solvent with an air pump.

10. A method for cleaning an oil strainer and pan in an internal combustion engine from which substantially all the lubricant has been drained according to claim 9, further comprising pressurizing said air pump to between about 4 and about 7 p.s.i.

11. A method for cleaning an oil strainer and an oil pan in an internal combustion engine from which substantially all the lubricant has been drained comprising:

holding a solvent in a first tank;

pumping said solvent from said first tank to a second tank;

holding a measured amount of said solvent in said second tank, said measured amount being sufficient to fill said oil pan to the level of said strainer only;

extending a conduit between said second tank and said oil pan;

pumping said measured amount of solvent from said second tank to said oil pan through said conduit to said oil pan so as to fill said oil pan to the level of said strainer only;

agitating said solvent in said oil pan; and collecting said solvent from said oil pan.

12. A method for cleaning an oil strainer and pan in an internal combustion engine from which substantially all the lubricant has been drained according to claim 11, further comprising agitating said solvent in said oil pan with an air pump.

13. A method for cleaning an oil strainer and pan in an internal combustion engine from which substantially all the lubricant has been drained according to claim 11, further comprising heating said solvent.

14. A method for cleaning an oil strainer and pan in an internal combustion engine from which substantially all the lubricant has been drained according to claim 11, further comprising pumping and agitating said solvent with a single air pump.

15. A method for cleaning an oil strainer and pan in an internal combustion engine from which substantially all the lubricant has been drained according to claim 11, wherein pumping solvent into said second tank and said oil pan further comprises pumping said solvent with an air pump.

16. A method for cleaning an oil strainer and pan in an internal combustion engine from which substantially all the lubricant has been drained according to claim 15, wherein pumping solvent into said oil pan from said second tank further comprises pressurizing said air pump to between about 4 and about 7 p.s.i.

17. A method for cleaning an oil strainer and pan in an internal combustion engine from which substantially all the lubricant has been drained according to claim 15, wherein pumping solvent into said second tank from said first tank further comprises pressurizing said air pump to between about 12 and about 15 p.s.i.

* * * * *